Dec. 29, 1970 J. G. GRAEME 3,551,832

TRANSISTOR BASE CURRENT COMPENSATION SYSTEM

Filed Aug. 1, 1969

INVENTOR
JERALD G. GRAEME
BY
Drummond, Cahill & Phillips
ATTORNEYS

United States Patent Office 3,551,832
Patented Dec. 29, 1970

3,551,832

TRANSISTOR BASE CURRENT COMPENSATION SYSTEM

Jerald G. Graeme, Tucson, Ariz., assignor to Burr-Brown Research Corporation, a corporation of Arizona Filed Aug. 1, 1969, Ser. No. 846,898
Int. Cl. H03f 3/18
U.S. Cl. 330—17 8 Claims

ABSTRACT OF THE DISCLOSURE

An input connection is made to the base electrode of an input transistor, the emitter-collector circuit of which is connected in series with the emitter-collector circuit of a sensing transistor. Both transistors are of the same conductivity type and form a first series circuit. A biasing transistor and a compensating transistor of opposite conductivity type are connected with their respective emitter-collectors in series to form a second series circuit; the first and second series circuits are connected in parallel. The base electrodes of the sensing and biasing transistors are interconnected as well as the base electrodes of the input and compensating transistors.

The present invention pertains to a transistor base current compensation system, and more particularly, to a circuit arrangement to eliminate the errors resulting from input current from a signal source when applied to the base electrode of a transistor.

When the base electrode of a transistor is utilized as the recipient of an input signal from a signal source, the base current required must be delivered from the signal source or be supplied by additional biasing circuitry. If the signal source is required to provide the base current flow, this current flow through the impedance of the signal source results in the generation of an error voltage. The error voltage is particularly undesirable in precision applications, such as frequently occurs in the operational amplifier art. The error is extremely difficult to eliminate, particularly in view of the fact that the magnitude of the error will vary as the input signal varies and will be temperature dependent; further, such other external variations, such as power supply voltage regulation, will induce changes in the error.

The prior art has primarily been concerned with the elimination of variations in the signal error caused by temperature change and a variety of circuits have been proposed to reduce temperature dependence. For example, the utilization of resistors to supply the necessary DC base current does not alleviate the problem of thermo variations created by temperature sensitivity of the transistor DC current gain. The utilization of resistors to supply the DC base current also results in the existence of a shunt circuit, the effects of which would normally be reduced through the utilization of large resistors; however, large resistors can neither accurately nor economically be reproduced in monolithic integrated circuit form. Variations in power supply voltage still exist when resistor current supply techniques are employed since the base current remains dependent on supply voltage. Other approaches have been suggested, such as the utilization of components, including transistors which are carefully, thermally matched. Thermo matching of components, particularly if the components are dissimilar, such as resistors and transistors or transistors of opposite conductivity types, is time-consuming, expensive and not sufficiently accurate to be completely satisfactory. Temperature compensating in this manner frequently employs the utilization of resistor base current supply which once again renders the utilization of such schemes unsuited for monolithic integrated circuit applications.

It is therefore an object of the present invention to provide a transistor base current compensation system wherein the input current to a transistor base is counteracted by an equal and opposite current to render the net input current approximately equal to zero.

It is another object of the present invention to provide a compensation system wherein the input current changes due to temperature are counteracted without the necessity of thermally matching the dissimilar components of the system.

It is still another object of the present invention to provide a transistor base current compensation system which counteracts the base current changes caused by variations in temperature, power supply, or input signal.

It is a further object of the present invention to provide a transistor base current compensation system that may accurately and economically be produced in monolithic integrated circuit form.

These and other objects of the present invention will become apparent to those skilled in the art as the description thereof proceeds.

Briefly, in accordance with an embodiment of the present invention, the base electrode of a transistor is provided for the receipt of an input signal. The DC base current flowing in the base of the transistor is compensated by an equal but opposite current flow from the base electrode of a compensating transistor connected to the base of the input transistor. The magnitude of the equal but opposite base current from the compensating transistor is derived through a feedback loop, including a transistor having its emitter-collector circuit connected in series with the input transistor. The base electrode of the sensing transistor is connected to the base electrode of a biasing transistor which, in turn, has its emitter-collector circuit connected in series with the emitter-collector circuit of the compensating transistor. By the proper selection and matching of the betas of similar transistors, the current flow generated in the base electrode of the compensating transistor will be equal and opposite to the base current flow of the input transistor.

The present invention may more readily be described by reference to the accompanying drawings, in which.

Figure 1:
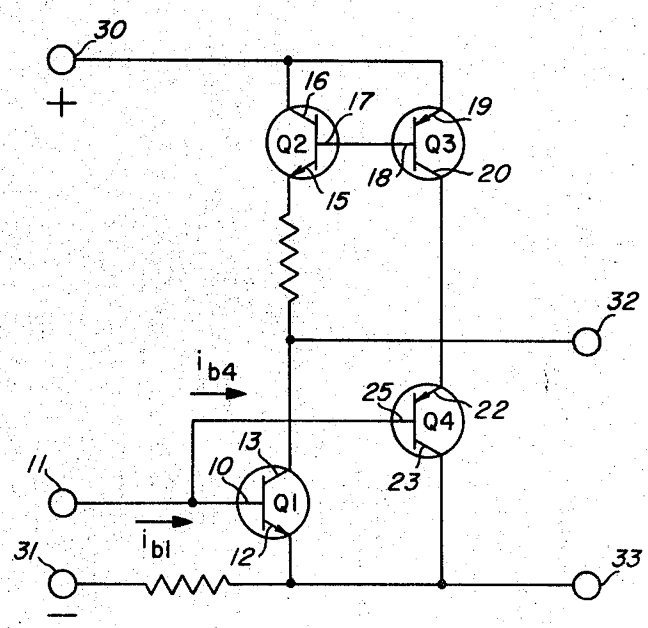
FIG. 1 is a schematic circuit diagram of a transistor base current compensating circuit constructed in accordance with the teachings of the present invention.

Referring now to FIG. 1, an input transistor Q1 includes a base electrode 10 connected to an input terminal 11. The emitter electrode 12 and collector electrode 13, forming an emitter-collector circuit, is connected in series with the emitter-collector circuit of transistor Q2 having emitter electrode 15 and collector electrode 16. The series connection of the two emitter-collector circuits may, for ease of description, be referred to as a first series circuit. The base electrode 17 of the transistor Q2 is directly connected to the base electrode 18 of a biasing transistor Q3. The emitter electrode 19 and collector electrode 20 of biasing transistor Q3 are connected in series with the emitter electrode 22 and collector electrode 23 of a compensating transistor Q4. The series connection of the emitter-collector circuits of transistors Q3 and Q4 may conveniently be termed the second series circuit. The first and second series circuits are connected in parallel across terminals 30 and 31 to which may be connected a suitable power supply source (not shown). The base electrode 25 of transistor Q4 is connected to the base electrode 10 of transistor Q1.

Alternative output terminals 32 and 33 are provided to enable the output of the cricuit to be from either a common collector or a common emitter configuration respectively.

Certain constraints are imposed on the choice of the respective transistors. It may be noted from an inspection of FIG. 1 that transistors Q1 and Q2 are of one conductivity type (NPN), while transistors Q3 and Q4 are of the opposite conductivity type (PNP). The conductivity types of the respective transistors may be changed so long as transistors Q1 and Q2 are of one type and transistors Q3 and Q4 are of another. The beta of each of the respective transistors is chosen to be substantially greater than unity (preferably five or larger) and the beta of transistors Q1 and Q2 are matched as are the betas of transistors Q3 and Q4. Beta may be defined as the ratio of collector current to base current in the common-emitter configuration, or simply the common-emitter current gain. Deriving betas larger than unity is quite simply achieved in both discrete component and monolithic circuits; indeed, a minimum beta of ten is readily obtained in common mass-produced monolithic structures. Betas in the order of 100 are easily obtainable and the matching of betas in transistors of the same conductivity type is easily obtained in manufacturing production processes. Thus, the above constraints placed on the choice of transistors in the circuit of FIG. 1 is easily obtainable in present manufacturing techniques without special requirements, such as are incurred when thermally matching dissimilar components.

The circuit of FIG. 1 results in a base current $i_{b4}$ equal and opposite to the base current $i_{b1}$. The equation defining this operation may be given as follows:

$$i_{b4}=\left(\frac{B1}{B2+1}\right)\left(\frac{B3}{B4+1}\right)i_{b1}$$

The description of the operation of the circuit of FIG. 1 will assist in the understanding of the significance of the equation given above.

An input signal current applied to the base electrode 10 will result in an increase in the collector current of the transistor Q1. Since the collector current of transistor Q1 will approximately equal the collector current of transistor Q2 (they are connected in series and the betas are sufficiently high that the collector current will very nearly equal the emitter current), the base current in the base electrode 17 will nearly equal the base current in the base electrode 10 (the betas of transistors Q1 and Q2 are matched). Since the base electrodes 17 and 18 are connected, the current in the base of transistor Q3 will be equal and opposite to that in the base electrode of transistor Q2. This current is therefore amplified by the beta of transistor Q3, resulting in a collector current in the collector electrode 20. Again, since the emitter-collector of transistor Q3 is connected in series with the emitter-collector of transistor Q4, the current flowing in the collector electrode 20 is equal to the current flowing in the emitter electrode 22. Since the betas of transistors Q3 and Q4 have been matched, the base current flowing in the base electrode 25 is approximately equal to that flowing in the base electrode 18 of transistor Q3. It may now be seen that this base current flowing in the base electrode 25 ($i_{b4}$) is equal but opposite to the base current originally flowing in the base electrode 10 of transistor Q1 ($i_{b1}$). The overall result of the application of base current to transistor Q1 is the compensating equal and opposite current provided by the base current of transistor Q4. This compensating current counteracts current changes resulting from temperature variations, power supply regulation, and input signal. The output available at either of the output terminals 32 and 33 will be a direct result of the attempted application of base current to the input transistor Q1 for which feedback loop provided by the sensing transistor Q2, the biasing transistor Q3, and the compensating transistor Q4 causes the circuit to seek a stable state wherein the base electrode of the compensating transistor supplies the entire base current of the input transistor Q1. We may now inspect the above equation which represents a shorthand mathematical designation of the above-described operation. It may be seen that since beta 1 equals beta 2 and beta 3 equals beta 4, and since all betas are substantially greater than unity, the base current of the transistor Q4 will be approximately equal and opposite to the base current of the transistor Q1. For example, a minimal NPN beta of 50 and a PNP beta of 5 represent an 80% base current compensation while a worst case monolithic PNP transistor beta of 10 represents a base current compensation of 90%. The utilization of betas commonly available in discrete transistor constructions (in the order of 100) represents virtual 100% base current compensation.

Figure 2:
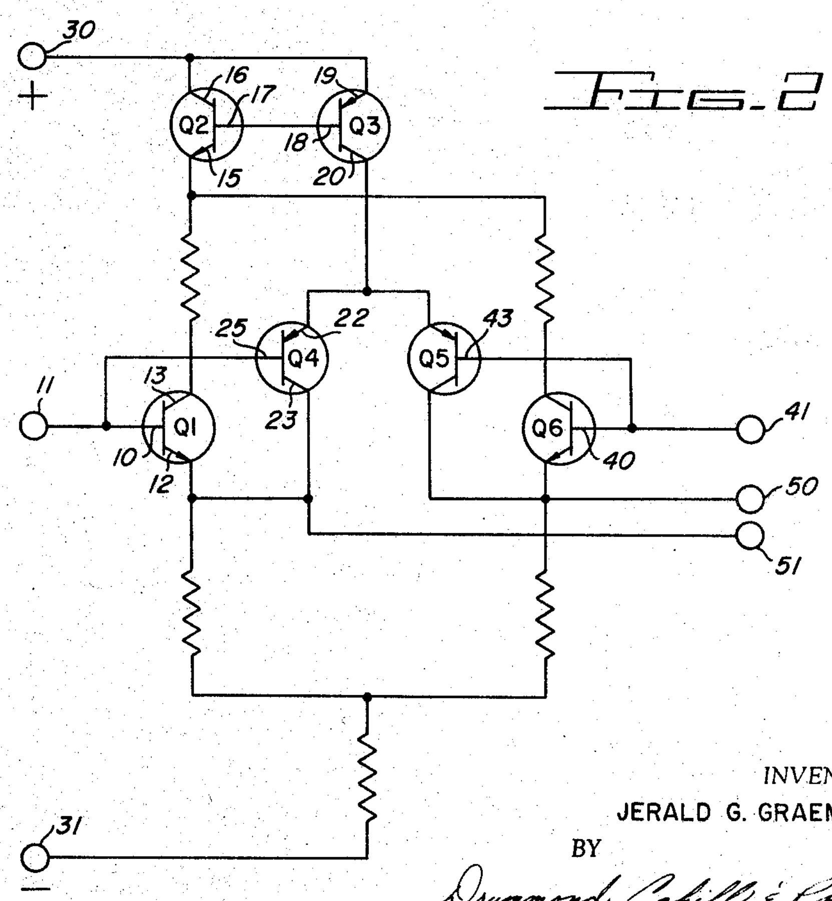
FIG. 2 is another embodiment of the base current compensation system of the present invention shown for use with a differential stage transistor circuit.

Referring now to FIG. 2, the concept of the present invention has been expanded to show an embodiment for use with a differential transistor stage commonly found in operational amplifier systems. It may be noted that input transistor Q1, sensing transistor Q2, biasing transistor Q3, and compensating transistor Q4 are identical with their counterparts shown in FIG. 1, and the electrodes thereof are accordingly given reference numerals. A second input transistor Q6 is provided having a base electrode 40 connected to a second input terminal 41. A second compensating transistor Q5 has been added and includes a base electrode 43 connected to the base electrode 40; however, it is unnecessary to duplicate the sensing and biasing transistors so long as the biasing transistor is of the same type as the added compensating transistor and so long as the betas of the two are matched. It may be seen that the input transistors Q1 and Q6 are connected with their emitter-collectors in parallel to form a first parallel circuit which, in turn, is connected in series with the emitter-collector of the sensing transistor Q2 to form a first series circuit. The compensating transistors Q4 and Q5 are connected with their emitter-collectors in parallel to form a second parallel circuit which is connected in series with the emitter-collector of the biasing transistor Q3. This latter combination of transistor Q3 and Q4 and Q5 may conveniently be termed the second series circuit. The first and second series circuits are then connected in parallel between terminals 30 and 31 which, as in the case with FIG. 1, may be connected to a suitable power source (not shown). In the embodiment of FIG. 2, the input transistors Q1 and Q6 and the sensing transistor Q2 are of the same conductivity type (NPN); the compensating transistors Q4 and Q5 and the biasing transistor Q3 are of an opposite or complementary conductivity type (PNP). The betas of transistors Q1, Q2, and Q6 are matched, while the betas of transistors Q3, Q4, and Q5 are matched. All betas are substantially greater than unity as in the case of the circuit of FIG. 1. The differential output is provided at output terminals 50 and 51. If an input base current variation is common to both the input transistors Q1 and Q6, the sum of the resulting collector currents will occur in the emitter of the sensing transistor and twice the sensing transistor base current will be generated. Since twice the base current will be provided to the biasing transistor Q3, twice the emitter current will be provided to the parallel connection of the compensating transistors Q4 and Q5. Therefore, each of the compensating transistors will receive sufficient emitter current to generate a base current in the respective base electrodes to compensate for the input base current variations in the respective input transistors Q1 and Q6. Since the embodiment shown in FIG. 2 is intended for differential detection, a differential signal applied between the input terminals 11 and 41 will result in equal but opposite input current changes occurring in the respective base electrodes of the input transistors Q1 and Q6, while the resulting change in the collector current of one input transistor may be, in one sense, the resulting collector current in the other input transistor will be in an opposite sense with a net variation in the sensing transistor base electrode current of zero. Under the latter circumstance, no base current is provided to the biasing transistor Q3 and no compensating base current will be generated in the base electrodes of the compensating transistors Q4 and Q5. If compensation is desired for differential as well as common input signals to the differential arrangement of FIG. 2, a separate sensing and biasing transistor may be provided for each of the input transistors.

It may therefore be seen that by the selection of transistor conductivity types, beta magnitude, and by matching beta, the present invention provides a transistor base current compensation system which renders the system immune to base current changes resulting from temperature dependence, power supply regulation, or input signal source impedance. The requirements of the respective transistors are moderate and readily achievable in both discrete and monolithic structures. It will be obvious to those skilled in the art that the compensation system of the present invention may be employed in a variety of circuits and circuit applications and that the transistors may assume a variety of forms.

I claim:

1. In a transistor circuit having an input connection to the base electrode of an input transistor, said input transistor having an emitter electrode and a collector electrode, a base current compensation system comprising: a sensing transistor, a biasing transistor, and a compensating transistor, each having emitter, collector, and base electrodes; said sensing and input transistors being of one conductivity type and having matching betas; said biasing and compensating transistors being of another conductivity type and having matching betas; means connecting the emitter-collector of said sensing transistor in series with the emitter-collector of said input transistor to form a first series circuit; means connecting the emitter-collector of said compensating transistor in series with the emitter-collector of said biasing transistor to form a second series circuit; means connecting said first and second series circuit in parallel; means connecting the base of said sensing transistor to the base of said biasing transistor, and the base of said compensating transistor to the base of said input transistor.

2. The combination set forth in claim 1, wherein said sensing and input transistors are NPN type and said biasing and compensating transistors are PNP type.

3. The combination set forth in claim 1, wherein said sensing and input transistors are PNP type and said biasing and compensating transistors are NPN type.

4. The combination set forth in claim 1, wherein the betas of all of said transistors are greater than five.

5. In a transistor differential circuit having first and second input connections to the base electrodes of a first and second input transistor respectively, each of said input transistors having an emitter, collector, and base electrode, the base current compensating system comprising: a sensing transistor, a biasing transistor, and a first and second compensating transistor, each of said transistors having emitter, collector and base electrodes; said sensing and input transistors being of one conductivity type and having matching betas; said biasing and compensating transistors being of another conductivity type and having matching betas; means connecting the emitter-collector of said first input transistor in parallel with the emitter-collector of said second input transistor to form a first parallel circuit; means connecting the emitter-collector of said sensing transistor in series with said first parallel circuit to form a first series circuit; means connecting the emitter-collector of said first compensating transistor in parallel with the emitter-collector of said second compensating transistor to form a second parallel circuit; means connecting the emitter-collector of said biasing transistor in series with said second parallel circuit to form a second series circuit; means connecting said first and second series circuit in parallel; means connecting the base of said sensing transistor to the base of said biasing transistor; and means connecting the base of said first and second compensating transistors to the base of said first and second input transistors respectively.

6. The combination set forth in claim 5, wherein said sensing and input transistors are NPN type and said biasing and compensating transistors are PNP type.

7. The combination set forth in claim 5, wherein said sensing and input transistors are PNP type and said biasing and compensating transistors are NPN type.

8. The combination set forth in claim 5, wherein the betas of all of said transistors are greater than five.

References Cited

H. W. Parmer, "Two Easy Ways to Stabilize Power-Transistor Hi-Fi Amplifiers,"—Electronics, pp. 56–58, Oct. 26, 1962 (330–23).

JOHN KOMINSKI, Primary Examiner
LAWRENCE J. DAHL, Assistant Examiner

U.S. Cl. X.R.

330—23, 30